Nov. 25, 1969 — A. J. KANYOK — 3,480,147
FILTRATION SYSTEM SEAL
Filed May 22, 1967 — 2 Sheets-Sheet 1

INVENTOR
Anthony Kanyok
BY
ATTORNEY

United States Patent Office 3,480,147
Patented Nov. 25, 1969

3,480,147
FILTRATION SYSTEM SEAL
Anthony J. Kanyok, East Hanover, N.J., assignor to American Standard Inc., a corporation of Delaware
Filed May 22, 1967, Ser. No. 640,305
Int. Cl. B01d 13/00
U.S. Cl. 210—321                                      10 Claims

ABSTRACT OF THE DISCLOSURE

An ultra filtration system which includes a pair of manifold headers and a plurality of tubes between the headers. The tubes include a rigid support tube and a filter tube within the support tube. A resilient tubular plug is distorted and compressed in the space betwen a feed pipe and the filter tube in order to establish a fluid tight seal.

---

The present invention relates to an expansion plug of resilient material which is used to form a fluid tight seal in the open mouth of tubular members such as those employed in ultra-filtration systems as for example in a water desalination system in which an osmotic tubular membrane separates the solute from the solution.

In the type of water desalination systems described in copending applications, Ser. No. 508,052 filed Nov. 16, 1965 and now abandoned, Ser. No. 508,037 filed Nov. 16, 1965 and now abandoned, Ser. No. 567,304 filed July 22, 1966 and now Patent No. 3,425,562, all of which assigned to the assignee hereof, salt water is fed by pipes through the inside of a porous support tube lined with a tube of an osmotic membrane. The fresh water is collected on the outside of the porous tube and it is therefore essential to prevent the brine from seeping around the circumferential edges of the osmotic membrane into the fresh water. This is done in accordance with the present invention by means of a resilient tubular expansion plug in which the thickness of the wall of the plug in at least one portion of its length as in an annular ring is made greater than the space between the exterior of the salt water feed pipe and interior of the porous support tube with osmotic tubular membrane lining.

One preferred way to establish the water tight seal of the present invention is to place the resilient tubular expansion plug inside the mouth of the porous support tube and then force the salt water feed pipe to pass through the opening in the resilient expansion plug. The salt water feed pipe and the porous support tube are rigid members as compared to the distortable resilient plug and as a result when the salt water feed pipe is forced through the opening in the resilient plug the enlarged annular ring portion of resilient material is distorted and tightly compressed in the annular space between the relatively rigid feed pipe and porous tube with osmotic tubular membrane lining. It is this compression of the resilient material that forms a water tight seal to prevent salt water from leaking out between the osmotic tube and the salt water feed pipe into the fresh water collected on the outside of the porous support tube.

Further details of the present invention may best be understood by description given in connection with the drawings which illustrate certain preferred embodiments of the invention and in which:

FIG. 1 illustrates one way in which the resilient tubular expansion plug of the present invention can be used to establish a fluid tight seal in the space between two tubular members.

FIGS. 2A through F illustrate a number of embodiments of the resilient tubular expansion plugs of the present invention.

Figure 1:
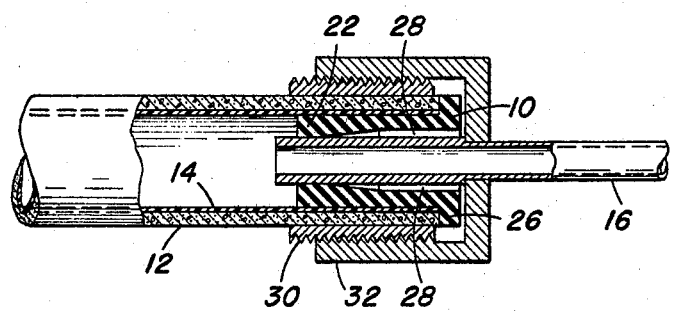

Turning now to FIG. 1, the resilient tubular expansion plug 10 of the present invention is there shown in position inside the mouth of a porous support tube 12 which is lined with a tube of osmotic membrane 14 of the type used in water desalination systems. The support tube 12 may be made of a porous ceramic material or woven fiber glass and the osmotic tubular lining such as the cellulose acetate film shown is only a few thousandths of an inch thick. Salt water is fed to the interior of the osmotic tube by means of a pipe 16 and the fresh water is collected on the outside of the porous support tube. The tubular expansion plug 10 is made of a resilient compressible elastomer such as rubber and in the preferred form of structure shown silicone rubber having a Shore A durometer of about 55 to 60. As described hereinabove, the porous support tube 12 and the feed pipe 16 are rigid members as compared to the resilient compressible plug 10. As a result the feed pipe 16 will distort and compress the wall of the resilient plug against the wall of the support tube without distortion of the relatively rigid feed pipe.

Details of the construction of the resilient tubular expansion plug 10 are shown in FIG. 2A. As there shown the outside diameter of the tubular plug is such that the plug will readily fit snugly into the inside of the mouth of the osmotic tube 14 and as shown in FIG. 1 the entire body of the plug is contained within the confines of the porous support 12. The inside diameter of the opening 18 at the top 20 of plug 10 is such that the salt water feed pipe 16 will readily fit into the inside of the opening at the top of the plug. In this embodiment the annular ring of resilient compressible material with thickness greater than the space between the salt water feed pipe and inside of the osmotic tube is formed by restricting the opening through the plug by means of a taper 22 which so narrows the opening down that the inside diameter at the bottom 24 of plug 10 is smaller than the outside diameter of the salt water feed pipe. In the embodiment shown the outside diameter of the feed pipe is approximately 0.312 inch while the inside diameter of the opening at the bottom of the plug is approximately 0.2 inch.

The structure shown in FIG. 1 may be most conveniently assembled by placing the plug 10 in the inside of the mouth of the osmotic tube 14. The bottom of collar 26 with outside diameter greater than the inside diameter of the osmotic tube rests on top of the rim of the porous support 12 and the collar assists in holding the tubular expansion plug in position in the mouth of the osmotic tube. After the plug is in position inside the mouth of the osmotic tube the salt water feed pipe 16 is forced down through the opening in the expansion plug and as the rim of the relatively rigid feed pipe passes along the taper 22 it expands the opening to distort and compress the resilient material of the plug in the annular space between the salt water feed pipe and interior of the osmotic tube. This forms the water tight seal which prevents salt water from leaking out of the interior of the osmotic tube into the fresh water collected on the outside of the porous support tube 12. As best shown at 28 of FIG. 1 it is not necessary to have the top portion of the wall of the opening in the plug in contact with the salt water feed tube or osmotic tubular membrane as the seal of the compressed resilient material in the bottom portion of the plug is adequate to prevent salt water from leaking up into the rim of the mouth of the tube. It is best to form the compression seal in an annular ring positioned in the inside of the mouth of the osmotic tube a short distance away from the rim of the porous tube for the reason that the configuration of the rim of the osmotic tube may not exactly correspond to the configuration of the rim of the porous tube. Any salt water that comes in contact with the porous tube is free to pass through the wall of the porous tube into the fresh water outside the osmotic tube.

Another advantage of the compression seal of the present invention is that the compressed resilient material in the ring of the seal will expand and contract to compensate for uneven expansion and contraction of the salt water feed pipe relative to that of the ceramic support tube such as may be experienced with change of atmospheric and feed water temperatures. Another advantage of the resilient tubular plug of the present invention is that the water tight seal may be broken by removing the plug and feed pipe for inspection or cleaning of the osmotic tube and the same plug can be re-used to again establish the water tight seal after the inspection.

In the form of structure shown in FIG. 1 a threaded collar 30 is attached to the top around the exterior of the porous support tube 12 and a cap nut 32 is screwed down over the expansion plug 10 to assist in holding the plug in its sealing position in the osmotic tube.

Figure 2:
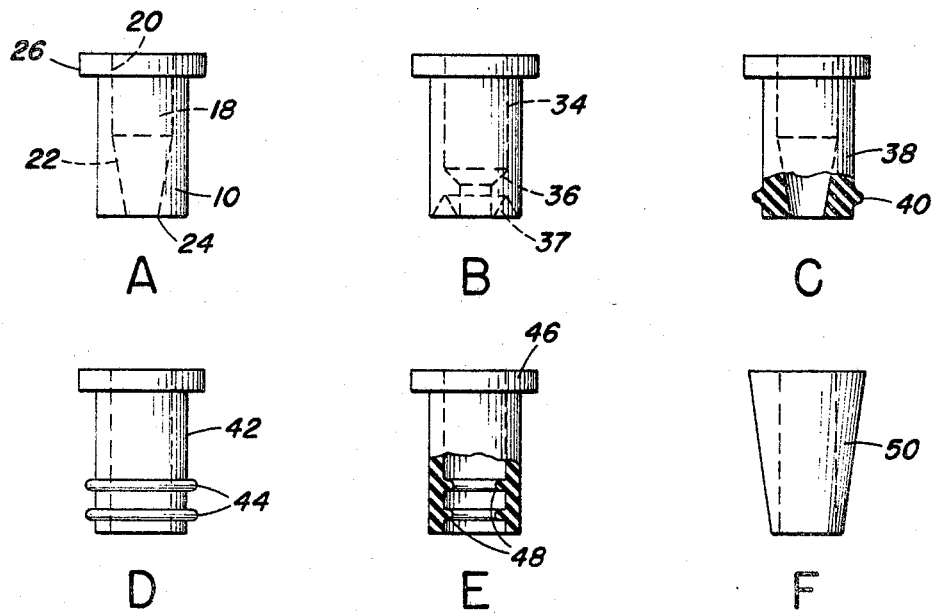

As best illustrated in FIG. 2 the annular ring of resilient material having a greater thickness than that of the annular space between the salt water feed tube and osmotic tube may be formed in a number of ways. In FIG. 2B the opening in the resilient tubular plug 34 is provided with an abrupt reduction in the inside diameter of the tube as at 36 to form an annular ring of resilient compressible material in the end portion of the wall of the plug which forms the water tight seal in an area which has an appreciably shorter height than in the case of plug 10. In some applications, it may be desirable to position an annular V shaped groove 37 in the bottom surface of the plug. The V shaped groove assists in forming the water tight compression seal due to the fact that the force of the pressure of the salt water acting against the sides of the V will assist in forcing the resilient material tightly against the salt water feed tube and osmotic tube.

In FIG. 12C the resilient tubular plug 38 is identical to the plug 10 of FIG. 2A except for an annular bead 40 which is molded on the exterior of the lower end portion of the plug. The bead enhances the water tight seal of the plug. In the embodiment shown in FIG. 2D the inside diameter of the opening in the resilient tubular plug 42 is the same from the top to the bottom of the plug and the thickness of the wall of the plug is approximately equal to or a little smaller than the space between the salt water feed tube and interior of the osmotic membrane. The annular ring of resilient material with thickness greater than the space between the feed tube and osmotic membrane is formed by molding one or more annular beads 44 in position around the exterior of the tube. Compression of the resilient material in the area of the annular bead will provide the fluid tight seal against leakage of salt water. The annular bead 44 need not be molded as an integral part of the wall of the plug. The annular bead, or example may comprise a rubber O ring attached around the exterior of the wall of the plug. In this structure insertion of the feed pipe through the opening of the plug will compress the resilient wall of the plug in the area of the annular bead and the force of the compression of the resilient material will force the O ring out against the wall of the osmotic tube and the wall of the plug will also be forced inwardly against the feed tube to form the water tight seal. The resilient tubular plug 46 shown in FIG. 2E is the same as plug 42 of FIG. 2D except that one or more annular resilient beads 48 are molded on the interior wall of the opening through the plug instead of on the outside of the wall of the plug as in FIG. 2D.

In the structure shown in FIG. 2F the opening through the entire length of the tubular plug 50 is approximately equal to or slightly less than the outside diameter of the salt water feed pipe. The outside diameter of the bottom of the plug is such that the bottom of the plug will readily fit into the mouth of the osmotic tube. The annular ring of resilient material of greater thickness than the space between the salt water feed tube and the inside of the osmotic tube is formed by tapering the outside wall of the plug outwardly toward the top to give an outside diameter at the top of the plug greater than the inside diameter of the osmotic tube. In this case compression of the resilient material in the top portion of the plug will establish the fluid tight seal.

Figure 3:
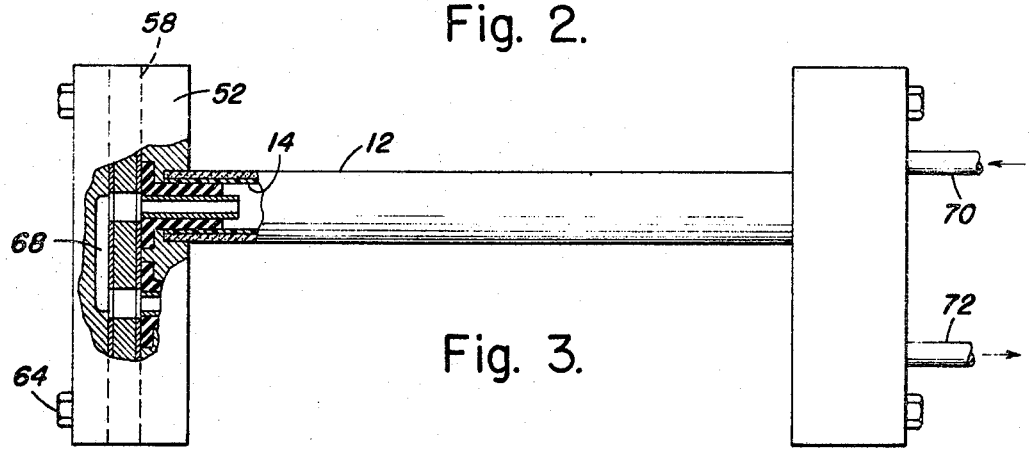
FIG. 3 illustrates a second way in which the resilient tubular expansion plug of the present invention may be used to establish a fluid tight seal between two tubular members.

The structure illustrated in FIG. 3 comprises a plurality of porous support tubes 12 each of which are lined with a suitable osmotic membrane 14. For convenience only one osmotic tube and its porous support tube is shown in the drawing. Salt water is fed into the first osmotic tube by means of feed pipe 16 and each of the successive osmotic tubes are connected in turn by means of the salt water feed pipes 52 and channels 53 which are cut into an end manifold plate 54. The concentrated salt water leaves the assembly by means of the outlet feed pipe 16. Fresh water is collected outside the porous support tubes 12 by any suitable means (not shown).

The structure illustrated in FIG. 3 comprises a plurality of porous support tubes 12 each of which are lined with a suitable osmotic membrane 14. For convenience only one osmotic tube and its porous support tube is shown in the drawing.

Figure 4:
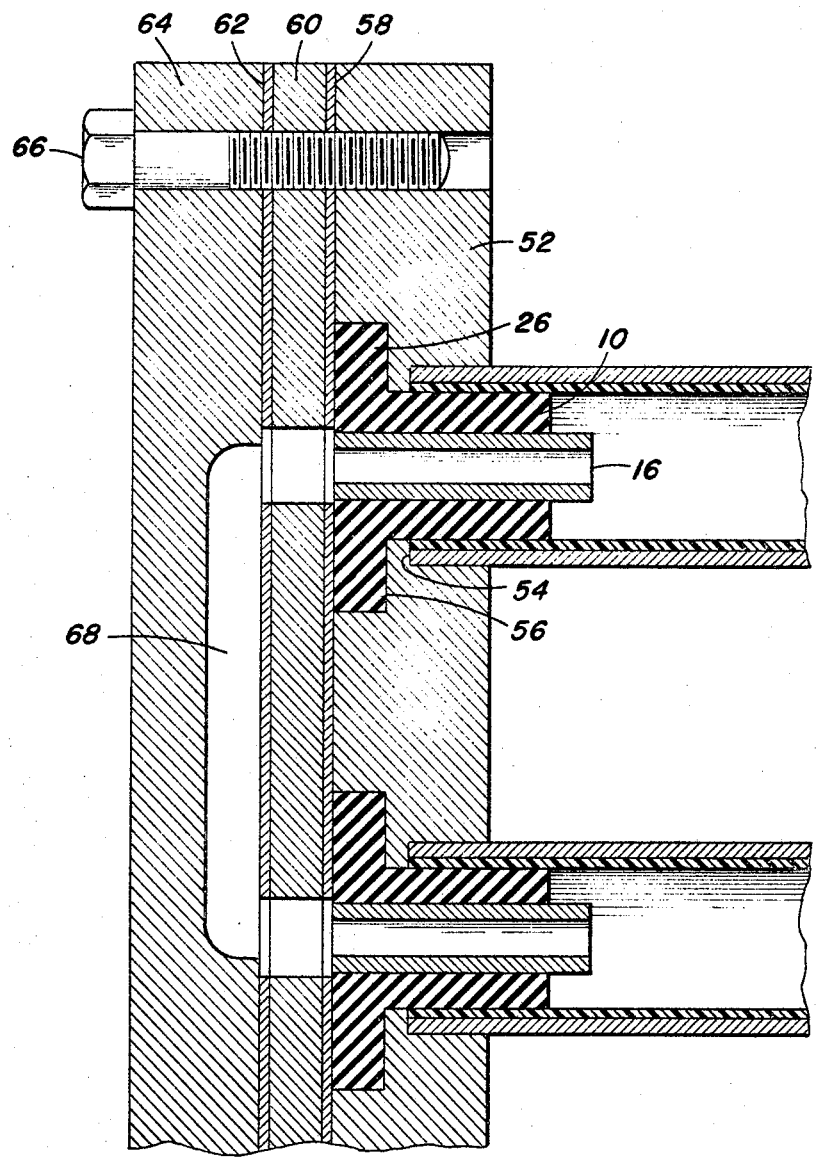
FIG. 4 shows the details of a preferred way of assembling the plug in the tube of FIG. 3.

Referring to FIGS. 3 and 4, it will be seen that in the assembly of FIG. 3 each of the opposite ends of the porous support tube is mounted in an opening in a tube sheet 52 preferably by means of a suitable adhesive. As best shown in FIG. 4, the end of each porous support tube abuts against a shoulder 54 of tube sheet 52. After the support tubes are mounted in the tube sheet, a resilient expansion plug 10 is positioned in the open mouth of each of the osmotic tubes 14. Shoulder 26 of the resilient expansion plug is recessed in the tube sheet with the bottom of the shoulder of the plug positioned against a second shoulder 56 of tube sheet 52. Thereafter the salt water feed pipes 16 are inserted into the opening of each of the resilient expansion plugs so that the end of the feed pipes is approximately flush with the outside surface of the tube sheet 52. A gasket 58 is then positioned against the outside surface of the tube sheet and a metal spacer plate 60 is mounted in position against the gasket. The metal spacer plate has suitable openings therein which are aligned with the openings of the salt water feed pipes. The assembly is then completed by placing a second gasket 62 against metal spacer plate 60 and an end manifold plate 64 is mounted against the gasket and the whole is securely clamped together by means of bolts 66. The end manifold plate 64 has a plurality of channels 68 which are cut into the surface of the plate to form a connection between adjacent salt water feed pipes 16 as best illustrated in FIG. 3.

As previously described in connection with the structure shown in FIG. 1, the salt water feed pipes compress the resilient material of the plugs in the space between the feed pipe and interior of the osmotic tubes to establish the fluid tight seal described in connection with the structure of FIG. 1. Salt water is fed into the first osmotic tube as at 70 and the water flows in turn through each of the successive tubes which are connected by means of the channels 68 in the end manifold plate. The concentrated salt water leaves the assembly at 72. Fresh water is collected outside the porous support tubes 12 by any suitable means not shown.

It will be understood that it is intended to cover all changes and modifications of the preferred embodiments of the invention, herein chosen for the purpose of illustration, which do not depart from the spirit and scope of the invention.

What is claimed is:

1. In an ultra-filtration system, the structure which comprises a porous support tube, an osmotic membrane seated within said support tube, a removable resilient tubular plug positioned inside the open mouth of said support tube, a feed liquor pipe positioned in the opening through the resilient tubular plug, at least the lower portion of the body of said resilient tubular plug being distorted and compressed in the annular space between the feed liquor pipe and support tube to establish a fluid tight seal between the support tube and membrane.

2. A structure as specified in claim 1 in which at least one molded bead of resilient material is positioned on the body of the tubular plug within that portion of the body of the plug that is compressed in the annular space between the feed liquor pipe and support tube.

3. A structure as specified in claim 1 in which a generally V shaped annular groove is positioned in the exposed surface at one end of the plug.

4. A structure as specified in claim 1 in which the inside diameter of the opening in the resilient tubular plug is less than the outside diameter of the feed liquor tube in at least one portion of the body of the plug prior to assembling the plug in the support tube.

5. A structure as specified in claim 1 in which at least one O ring is positioned on the body of the resilient tubular plug.

6. A structure as specified in claim 1 in which a molded bead is positioned on the body of the tubular plug to make the thickness of the said annular ring greater than the space in an annular ring between the inner and outer tubular members.

7. A structure as specified in claim 1 in which the outside diameter of the tubular resilient plug is approximately equal to the inside diameter of the said outer tubular member and in which the inside diameter of the opening in the tubular plug in at least one portion of the body of the tubular plug is less than the outside diameter of the inner tubular member in order to form the said annular ring in the plug that is greater than the space in an annular ring between the two tubular members.

8. A structure as specified in claim 1 in which the outside diameter of the opening in the tubular plug is approximately equal to the outside diameter of the inner tubular member and in which the outside diameter in at least one portion of the body of the plug is greater than the inside diameter of the outer tubular member in order to form the said annular ring in the plug that is greater than the space in an annular ring between the two tubular members.

9. A structure as specified in claim 1 in which a collar of outside diameter greater than the outside diameter of the body of the plug is positioned around the exterior of the rim of the mouth at one end of the tubular plug.

10. An ultra-filtration system comprising a plurality of porous support tubes, an osmotic membrane seated within each of said support tubes, a removable resilient tubular plug positioned inside the mouth of each of said support tubes, a feed liquor pipe positioned in the opening through the resilient tubular plug, at least the lower portion of the body of said resilient plug being distorted and compressed in the annular space between the feed liquor pipes and support tubes to establish a fluid tight seal between the support tubes and membranes and means for connecting the ends of adjacent support tubes whereby liquid may be fed in turn through each of the plurality of support tubes.

References Cited

UNITED STATES PATENTS

| | | | |
|---|---|---|---|
| 726,629 | 4/1903 | Brown | 215—47 |
| 2,649,245 | 8/1953 | Silverstolpe | 215—47 X |
| 2,664,395 | 12/1953 | Marehand | 210—455 X |
| 2,956,070 | 10/1960 | Jennings et al. | 210—22 |
| 3,330,281 | 7/1967 | Visser | 215—47 X |
| 2,502,614 | 4/1950 | Zender | 210—321 |

FOREIGN PATENTS 309,913  12/1955  Switzerland.

OTHER REFERENCES

Loeb, Sidney: A Composite Tubular Assembly For Reverse Osmosis Desalination, Desalination, vol. I, No. 1, April 1966, p. 41.

REUBEN FRIEDMAN, Primary Examiner

T. A. GRANGER, Assistant Examiner